United States Patent [19]

Lonsmin

[11] 4,381,615

[45] May 3, 1983

[54] INEXPENSIVE WRITING INSTRUMENT WITH ILLUSION PRODUCING MEANS

[76] Inventor: Victor Lonsmin, 1406 Ogden, LaGrange, Ill. 60525

[21] Appl. No.: 319,478

[22] Filed: Nov. 9, 1981

[51] Int. Cl.[3] .......................... G09F 3/00; G09F 7/00; A63J 3/00; G02B 27/02

[52] U.S. Cl. ........................................ 40/334; 40/905; 40/486; 40/488; 40/366; 272/8 N; 434/371

[58] Field of Search ................. 40/334, 905, 486, 487, 40/488, 563, 310, 324, 311, 10 D, 19, 335, 307, 366; 272/8 N, 8 D, 8.5, 27 N, 8 R; 401/195, 194, 243, 247, 244, 245, 246; 70/165, 58; 434/102, 121, 391, 395, 396, 371

[56] References Cited

U.S. PATENT DOCUMENTS

| | | | |
|---|---|---|---|
| 1,734,650 | 11/1929 | Salinger | 40/334 |
| 2,264,194 | 11/1941 | Wuestman | 40/334 |
| 2,808,670 | 10/1957 | Katz | 40/334 |
| 3,250,033 | 5/1966 | Siegel | 40/334 |
| 4,037,343 | 7/1977 | Lonsmin | 40/334 |
| 4,330,954 | 5/1982 | Lonsmin | 40/486 |

*Primary Examiner*—Robert A. Hafer
*Assistant Examiner*—Michael J. Foycik, Jr.
*Attorney, Agent, or Firm*—Gary, Juettner & Pyle

[57] ABSTRACT

A novelty writing instrument having cap and body members, each carrying part of an illusion producing device, is shown and described. By moving the cap and body members relative to one another, an illusion can be created.

10 Claims, 6 Drawing Figures

INEXPENSIVE WRITING INSTRUMENT WITH ILLUSION PRODUCING MEANS

This invention relates to a novelty writing instrument and more particularly to an inexpensive writing instrument having at least a two part construction, with the two parts being movable relative to one another to create an illusion.

DESCRIPTION OF THE PRIOR ART

In the prior art there have been various means for creating an illusion, and in particular to create an illusion on a writing instrument. One of the more successful prior art devices is the novelty writing instrument shown in my earlier U.S. Pat. No. 4,037,343. While this prior art device works well and creates a superb illusion, it has the disadvantage of being relatively complicated in structure, expensive to manufacture, and consequently must be sold at a higher price than a similar pen without the illusion producing feature.

BRIEF DESCRIPTION OF THE INVENTION

The novelty writing instrument of the present invention comprises at least two relatively movable members, preferably in the form of a body member carrying writing means and a cover or cap member for said body member for covering said writing means. Said body is one color and has at least a portion thereof of a different color forming part of the illusion producing means. The cap has an opening therein which also contains another portion of an illusion producing means. The illusion producing means on the cap includes a film carrying the image which is altered so as to create the illusion. The illusion is created by manually changing the relative position of the cap on the body so as to position the film over or away from the different color portion on the body.

It is one object of the present invention to provide a writing instrument with an illusion producing feature which is uncomplicated and inexpensive to manufacture.

Another object of the present invention is to provide a novelty writing instrument with an illusion feature that can be competitively marketed with other inexpensive writing instruments.

Still another object of the present invention is to provide a two part writing instrument with an illusion means which operates when the relative position of the two parts are manually changed.

These and other objects of the present invention will become apparent from the following written description and the accompanying figures of the drawings.

DESCRIPTION OF THE PREFERRED EMBODIMENTS

Figures 1, 2, 3:
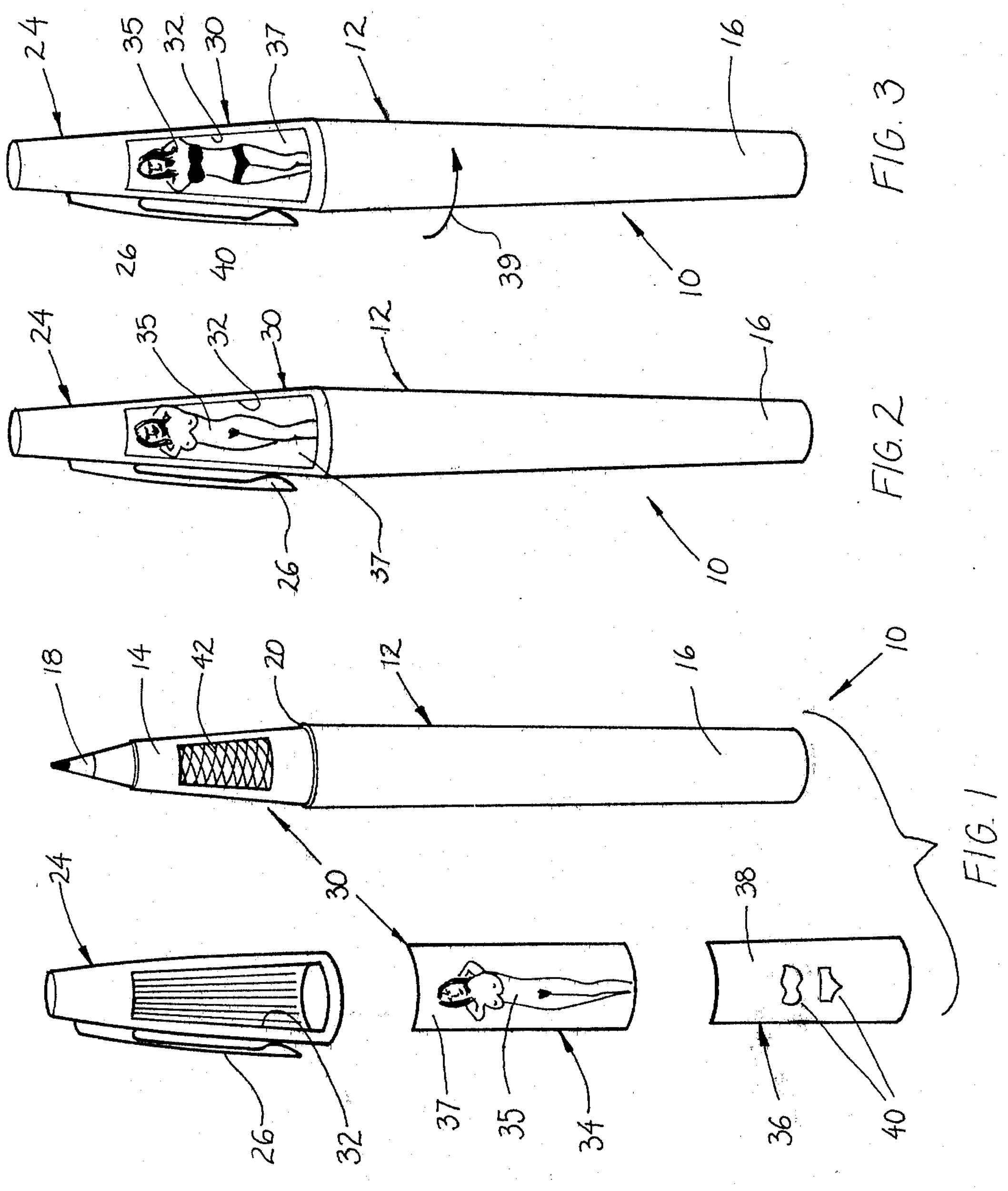
FIG. 1 is a perspective view of one embodiment of a novelty writing instrument of the present invention with a portion thereof shown in exploded view.
FIG. 2 is a perspective view of the novelty writing instrument of FIG. 1 shown in one relative position.
FIG. 3 is a perspective view of the novelty writing instrument of FIG. 1 shown in a second relative position.

Referring to FIGS. 1 to 3, the first embodiment 10 of the novelty writing instrument of the present invention is illustrated. As shown in FIG. 1, embodiment 10 has a plastic body member 12 which has an upper tapered end 14 and a lower, generally cylindrical end 16. A conventional writing mechanism 18 (only the top of which is shown), e.g., pencil, ballpoint, felt-tip or ink pen mechanism, is housed within the body member 12. If desired the juncture between the upper and lower ends 14 and 16 may be discontinuous or stepped (as indicated by the line 20), instead of smooth, for purposes of locating the cap member 24, hereinafter described, on the body member.

The embodiment 10, as mentioned includes a plastic cap member 24, which can alternatively fit on either the ends 14 or 16 of the pen. The placement on or removal of the cap member 24 covers or exposes the writing mechanism 18, as in conventional. The cap 24 may also be fitted with a pocket clip 26.

The illusion means or mechanism 30 has portions on both the body member 12 and cap member 24. In more detail, the cap member 24 has an opening 32 formed in it, the opening being of a shape complimentary to the shape of the cap and of the illusion to be provided. Illusion means 30 included a film element 34 and a background 36 which are secured in place to the cap member as by gluing or snap fit in an appropriate groove (not shown) formed about the margin of the opening 32. The film 34 carries an image, in this instance that of an attractive nude woman (indicated by member 24), which is otherwise transparent. The background 36 is opaque or non-transparent (indicated by the numeral 38) except for portions thereof which are to be made to appear and disappear, in this instance the woman's bathing suit (indicated by the numeral 40). The portion that is to appear and disappear (e.g. the bathing suit 40) is clear and/or translucent. The background's opaque portions may be formed by directly painting onto the inner surface of the film. By painting it on the inner surface, the film serves as protection for the applied coating. Otherwise, the background is placed behind the film.

The body member 12 at its upper end 14 carries a different color, preferably black, area or portion 42 (as indicated by the cross-hatching) which can be made to align with the transparent area 40 of the background 36, when the cap is installed in the body. The different color portion 42 does not extend completely around the entire circumference of the pen, but is of a size to cover only the clear area 40 of the background 36. A convenient manner in which to form the different color area is to apply or paint it onto the body 12, as by silk screening.

In this instance, the opaque portion 38 of the background 36 can be a desired color, and the color of the pen member 12 (other than for that of portion 42), is such as to permit the features of film 34 to be seen.

As can be seen in FIG. 2, when the cap member 24 is relatively positioned on the body member 12 so that the different color portion 42 is not behind the clear portion 40, all the features of the film are visible, i.e., the woman appears to be nude. As seen in FIG. 3, simply rotating the body member 12 and cap member 24 relative to one another, as indicated by the arrow 39, so that the different color portion 42 is behind the clear portions 40 changes the illusion. In such position the dominant dark different color area 42 is seen through the clear portions 40 and causes the features on the film 34 directly in front to be obliterated giving the appearance of the woman being clothed in a dark bathing suit.

Figure 4:
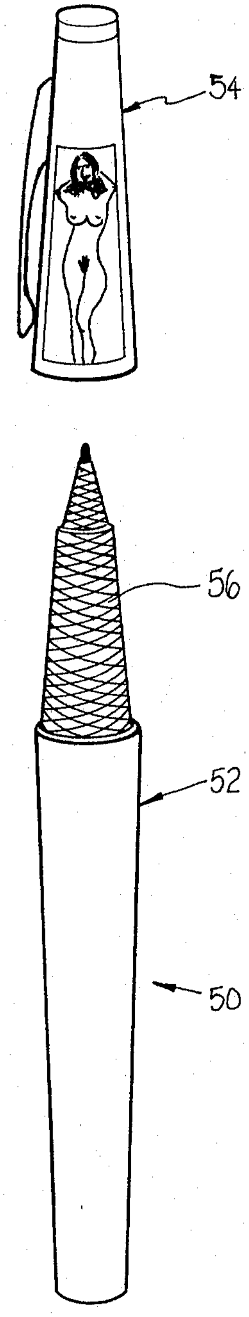
FIG. 4 is a perspective view of a second embodiment of novelty writing instrument of the present invention.
Figure 5:
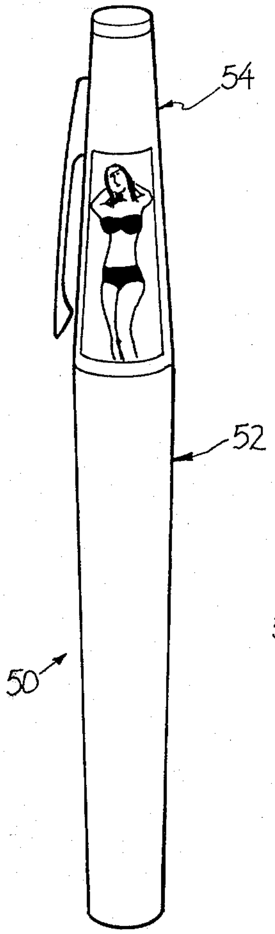
FIG. 5 is a perspective view of the novelty writing instrument of FIG. 4 shown in one relative position.
Figure 6:
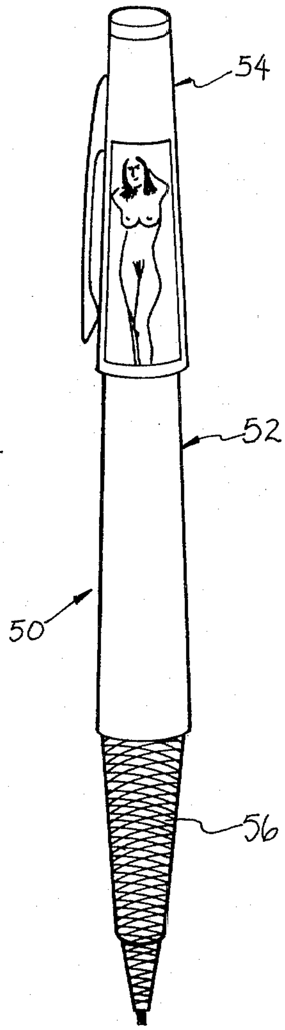
FIG. 6 is a perspective view of the novelty writing instrument of FIG. 4 shown in a second relative position.

Referring now to FIGS. 4 through 6, a second embodiment 50 of novelty writing instrument of the present invention is shown. In embodiment 60 there is a body member 52 and cap member 54. The cap member 54 is generally similar in construction to cap 24 of the first embodiment. As FIG. 4 shows, the different color portion 56 (indicated by the cross-hatching) is formed by the entire upper end of the body member 52. In embodiment 50 the change of the image or illusion occurs when the cap 54 is transferred from one end to the other end of the body member, instead of by relative rotation. As shown in FIG. 5 when the cap 54 is over the different color portion 56, the woman appears to be clothed in a bathing suit. When the cap is on the other end, as shown in FIG. 6, she appears to be nude.

While only the preferred embodiments on novelty writing instrument of the present invention has been illustrated and described, from the foregoing it should be understood that variations, modifications and equivalent structures thereof fall within the scope of the following claims:

What is claimed is:

1. In a writing instrument having a body member carrying a writing mechanism, a cap member removably fitting on said body member to cover said writing mechanism, the improvement comprising means on said cap and body members to create an illusion including an opening in said cap member, a film having an image being mounted on said cap member in said opening, said body member being of one color and having a different color area thereon, said different color area being selectively locatable behind said film by manually moving said cap member relative to said body member, when said different color area of said body member is away from said film all features of said image on said film are all visible, when said different color area is behind said film at least some of said features of said image on said film appear invisible, whereby said features on said film can be selectively backed or not backed by said different color area so that at least some of the features may be made to appear and disappear by manually moving said cap member relative to said body member.

2. In the writing instrument of claim 1, wherein said cap member may be rotated relative to said body member, and said different color area is brought behind said film by rotating said cap member relative to said body member.

3. In the writing instrument of claim 1, further comprising a background having translucent and opaque portions, and said features creating said illusion being located on those portions of said film backed by said translucent portion.

4. In the writing instrument of claim 3, wherein said background is applied to the inside surface of said film.

5. In the writing instrument of claim 1, wherein said opening is formed by a cut-out in said cap member, and said film is held in place in said cut-out.

6. In the writing instrument of claim 1, wherein said different color area is applied to said body member.

7. In the writing instrument of claim 6, wherein said body and cap members are made of colored plastic material.

8. In the writing instrument of claim 1, wherein said cap member may be rotated relative to said body member and said different color area is brought behind said film by rotating said cap member relative to said body member, said opening being formed by a cut-out in said cap member, said film being held in place in said cut-out, and a background being painted onto the inside surface of said film, said different color area being painted on said body member.

9. In the writing instrument of claim 8, wherein said body and cap members are made of the colored plastic.

10. In the writing instrument of claim 1, wherein said different color area is located on and adjacent to one end of said body member, and said cap member is manually relative movable between the opposite ends of said body member.

* * * * *